(12) United States Patent
Wyman (10) Patent No.: US 8,749,703 B2
(45) Date of Patent: Jun. 10, 2014

(54) METHOD AND SYSTEM FOR SELECTING INTERPOLATION AS A MEANS OF TRADING OFF JUDDER AGAINST INTERPOLATION ARTIFACTS

(75) Inventor: Richard Hayden Wyman, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1295 days.

(21) Appl. No.: 12/025,520

(22) Filed: Feb. 4, 2008

(65) Prior Publication Data

US 2009/0195691 A1 Aug. 6, 2009

(51) Int. Cl.
*H04N 7/01* (2006.01)
(52) U.S. Cl.
USPC .............................. 348/441; 348/458; 348/701
(58) Field of Classification Search
USPC ................................. 348/441–445, 607, 497; 375/240.16–240.17
See application file for complete search history.

(56) References Cited

U.S. PATENT DOCUMENTS

| | | | | |
|---|---|---|---|---|
| 6,111,610 A | * | 8/2000 | Faroudja | 348/441 |
| 6,816,552 B2 | * | 11/2004 | Demos | 375/240.15 |
| 7,158,186 B2 | * | 1/2007 | Selby et al. | 348/459 |
| 7,609,763 B2 | * | 10/2009 | Mukerjee et al. | 375/240.16 |
| 2003/0099410 A1 | * | 5/2003 | Daigi | 382/298 |
| 2008/0253455 A1 | * | 10/2008 | Van Zon et al. | 375/240.16 |

* cited by examiner

*Primary Examiner* — Benjamin R Bruckart
*Assistant Examiner* — Anthony Bantamoi
(74) *Attorney, Agent, or Firm* — Foley & Lardner LLP (57) ABSTRACT

A motion judder cancellation system may convert a source frame rate to an output frame rate. A repetition pattern within a sequence of source frames may be determined. Temporal position for output frames within a sequence may be based on a source frame position and a source frame interval fraction. An image blend mode such as motion vector interpolation may be determined for each output frame. Temporal position and/or image blend mode may be modified. Accordingly, motion judder and/or visible interpolation artifacts may be modified. Output frames may be generated based on the determined or modified image blend mode and/or the determined or modified temporal position of output frames. The output frames may be spaced temporally at even intervals or spacing. Frame rate may be increased and one or more repeated frames within a sequence of frames may be inserted. Generation of output frames may be programmed.

22 Claims, 10 Drawing Sheets

METHOD AND SYSTEM FOR SELECTING INTERPOLATION AS A MEANS OF TRADING OFF JUDDER AGAINST INTERPOLATION ARTIFACTS

CROSS-REFERENCE TO RELATED APPLICATIONS/INCORPORATION BY REFERENCE

Not applicable

FEDERALLY SPONSORED RESEARCH OR DEVELOPMENT

Not applicable

MICROFICHE/COPYRIGHT REFERENCE

Not applicable

FIELD OF THE INVENTION

Certain embodiments of the invention relate to image processing. More specifically, certain embodiments of the invention relate to a method and system for selecting interpolation as a means of trading off judder against interpolation artifacts.

BACKGROUND OF THE INVENTION

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

An artifact known as "motion judder" may occur when the picture rate of a video sequence is excessively low. Motion judder may occur when the temporal sampling rate is too low to describe motion in a scene. The objects in input pictures may be shifted on either side of a required output picture. A temporal digital filter interpolation method may be used to determine pixel intensity values. The signals describing motion of each of the objects within a scene may be referred to as motion vectors. Each pixel or region with the same movement may be allocated a motion vector. Motion estimation may be utilized to determine these motion vectors and failing to find a correct motion vector and/or misusing the motion vector in a picture rate converter may lead to noticeable artifacts. When large camera movements occur, regions of a picture close to the borders may have significantly less reliable motion vectors than those closer to the middle and special processing may be required at the picture boundaries.

Telecine is a process that may be used to transfer film sequences to television. Telecine may involve a vertical low-pass Kell-factor filtering of a source image followed by a frame-rate conversion through field repetition. For national television system committee (NTSC), the first 3 fields may be received from the first film frame, followed by 2 fields from the second film frame, followed by 3 fields from the third film frame and so on. The non-uniformity of frames may cause motion judder. In cases where the telecine transfer maps the same number of fields to a single frame, a blurring or stuttering phenomenon may be present because of low temporal resolution of the source images and the near-simultaneous display of two temporally-disparate images.

Interlaced video comprises of fields, each of which may be captured at a distinct time interval. A frame may comprise a pair of fields, for example, a top field and a bottom field. The pictures forming the video may comprise a plurality of ordered lines. During one of the time intervals, video content for the even-numbered lines may be captured. During a subsequent time interval, video content for the odd-numbered lines may be captured. The even-numbered lines may be collectively referred to as the top field, while the odd-numbered lines may be collectively referred to as the bottom field. Alternately, the odd-numbered lines may be collectively referred to as the top field, while the even-numbered lines may be collectively referred to as the bottom field.

In the case of progressive video frames, all the lines of the frame may be captured during one time interval. Interlaced video may comprise fields that were converted from progressive frames. For example, a progressive frame may be converted into two interlaced fields by organizing the even numbered lines into one field and the odd numbered lines into another field.

When encoding frame pictures, an encoder may utilize coding methods that treat frames as progressive video. These are generally referred to as progressive coding tools. It may be desirable to make the optimum choice between field and frame coding for every field or every pair of fields. The 3:2 pulldown video may comprise a pattern wherein some fields from the original content may be repeated two fields after their first occurrence, forming TBT (top bottom top) or BTB (bottom top bottom) patterns. When encoding video comprising a 3:2 pulldown pattern, it may be desirable to detect and reverse the 3:2 pulldown pattern to reconstruct the video, for example, 24 frames per second progressive video before encoding, and to encode the resulting frames of video using progressive coding tools.

Traditional 3:2 pulldown detectors measure the similarity of fields of the same polarity, for example, top (T) and T or bottom (B) and B, two fields apart, and may utilize this similarity measure to decide whether the current video input follows a 3:2 pulldown pattern or not. In 3:2 pulldown, the first and third fields of the TBT and BTB frames are theoretically identical, although they may be affected by noise.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for selecting interpolation as a means of trading off judder against interpolation artifacts, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for selecting interpolation as a means of trading off judder against interpolation artifacts. For telecine output frames resulting from a 3:2 pull-down and/or a 2:2 pull-down rate conversion pattern, visual telecine judder, or a lack of smoothness, may be reduced by spacing output frames at equivalent time intervals, or temporally equidistant positions. In addition, motion vector interpolation of two source frames may be applied to one or more output frames and may further enable a perception of motion that follows a smooth trajectory. However, motion vector interpolation may introduce unwanted visible artifacts due to ambiguities or errors in determining and/or representing an object's motion trajectory. In this regard, the number of output frames receiving motion vector interpolation may be reduced at the expense of the regularity in output frame spacing. Some embodiments of the invention may enable adjusting the number of frames receiving motion vector interpolation and/or the temporal regularity of output frame spacing.

Figure 1:
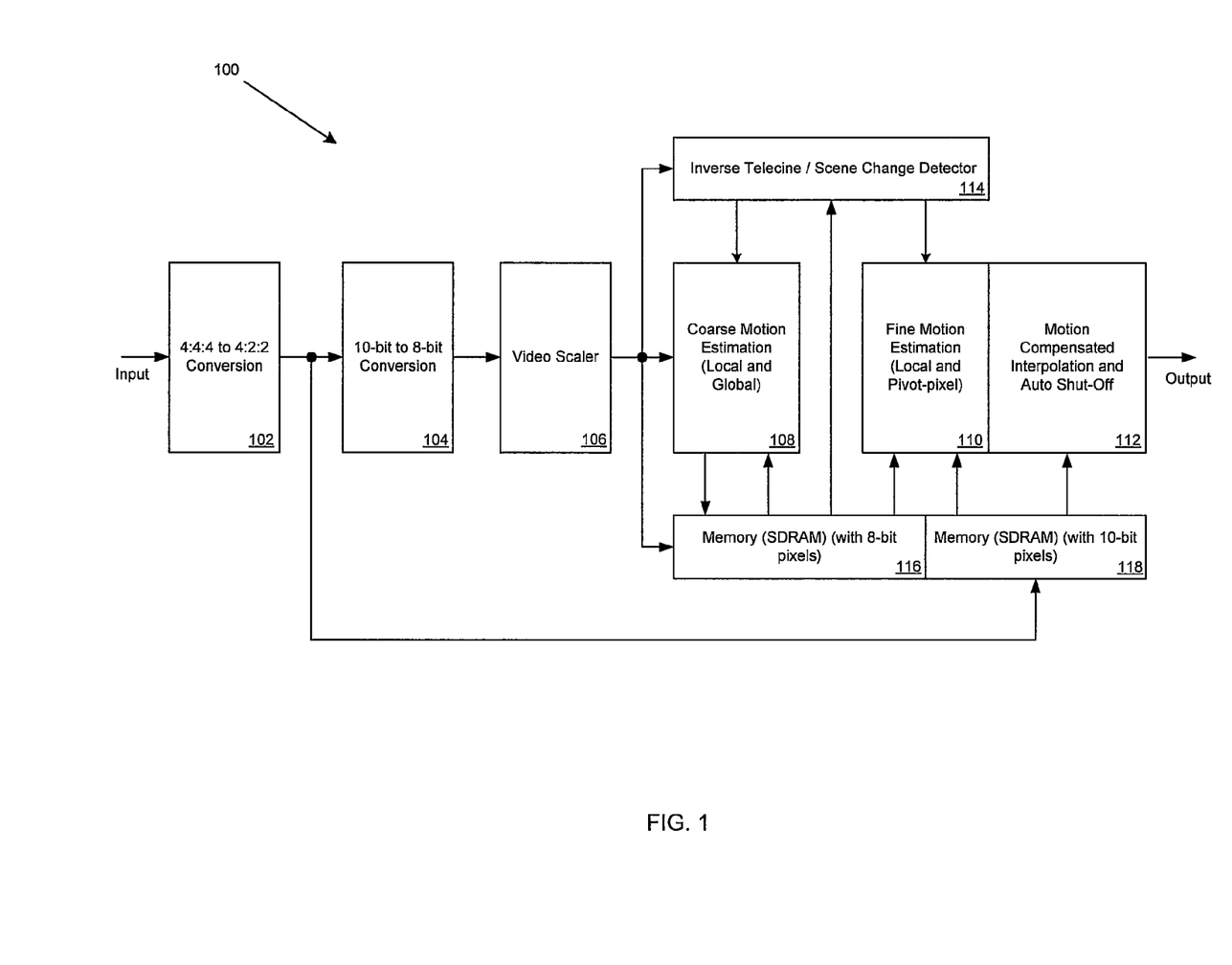
FIG. 1 is a block diagram of an exemplary motion judder cancellation system, in accordance with an embodiment of the invention.

FIG. 1 is a block diagram of an exemplary motion judder cancellation system, in accordance with an embodiment of the invention. Referring to FIG. 1, there is shown a motion judder cancellation system 100. The motion judder cancellation (MJC) system 100 may comprise a video conversion block 102, a bit conversion block 104, a video scaler 106, a coarse motion estimation block 108, a fine motion estimation block 110, a motion compensated interpolation and auto shut-off block 112, an inverse telecine block 114, a memory portion with 8-bit pixels 116 and a memory portion with 10-bit pixels 118.

The video conversion block 102 may comprise suitable logic, circuitry and/or code that may be enabled to convert the received video in 4:4:4 format to 4:2:2 format. The bit conversion block 104 may comprise suitable logic, circuitry and/or code that may be enabled to convert received 10-bit video data to 8-bit video data, for example. The video scaler 106 may comprise suitable logic, circuitry and/or code that may be enabled to scale the received 8-bit video data by modifying the resolution of the received video data and generate a scaled video output to the inverse telecine block 114, the coarse motion estimation block 108 and the memory portion with 8-bit pixels 116.

The inverse telecine block 114 may comprise suitable logic, circuitry and/or code that may be enabled to detect a cadence with 3:2 pulldown and/or 2:2 pulldown and perform motion estimation on the received picture. The inverse telecine block 114 may be enabled to detect scene changes in the received video pictures and determine whether to repeat pictures for the duration of the scene change. The inverse telecine block 114 may be enabled to pair incoming frames to determine a source frame rate and pulldown phase to facilitate motion-compensated conversion from the source frame rate to the output frame rate.

The memory region with 8-bit pixels 116 may comprise suitable logic, circuitry and/or code that may be enabled to receive and store the scaled video input and generated local and global motion vectors. The memory region with 8-bit pixels 116 may comprise suitable logic, circuitry and/or code that may be enabled to output the generated local and global motion vectors to the inverse telecine block 114 and the fine motion estimation block 110. The memory region with 10-bit pixels 118 may comprise suitable logic, circuitry and/or code that may be enabled to receive and store the converted input video. The memory region with 10-bit pixels 118 may be enabled to output converted input video to the fine motion estimation block 110 and the motion compensated interpolation and auto shut-off block 112.

The coarse motion estimation block 108 may comprise suitable logic, circuitry and/or code that may be enabled to generate block motion vectors and a global motion vector and determine the interpolation and filtering modes based on the received scaled input pictures. The coarse motion estimation block 108 may be enabled to accumulate a plurality of block motion vectors in order to estimate a global motion vector (GMV). The coarse motion estimation block 108 may be enabled to sort motion vectors into a histogram and generate the GMV.

The input video data may be a video sequence at a picture rate of X Hz, for example. The output generated may be a video sequence at a picture rate of Y Hz, for example, where Y≥X and Y may match the display picture rate. The coarse motion estimation block 108 may be enabled to utilize a motion vector search algorithm to track motion of objects among a plurality of pictures. The coarse motion estimation block 108 may be enabled to split local and global motion search functions in order to generate candidate motion vectors and their corresponding cost measures.

In accordance with an embodiment of the invention, in instances where a picture may not correspond to a scene change, each block in the picture may be associated with a local motion vector $(v_x, v_y)$. These local motion vectors, which may have sub-pixel resolution, may be combined together to build a vector field. The local motion search function may determine the forward and backward motion vectors for a given block location, where each vector may have a corresponding cost, for example, sum of absolute differences (SAD). Notwithstanding, the block size for motion estimation may vary, for example, 4×4 or 8×8.

For example, in a scene where a camera follows an airplane flying over a cloudy sky. The global motion may comprise a pan of the camera as it follows the airplane, and the airplane itself may be the object where motion may differ from global motion. A global motion vector may be derived based on a measure of global motion by collecting statistics, for example, a histogram of local motion vectors. Alternatively, the global motion vector may be approximated based on a pixel transformation, such as:

$$v_x = a_{11}x + a_{12}y + b_1$$

$$v_y = a_{21}x + a_{22}y + b_2$$

where (x,y) and ($v_x$,$v_y$) may indicate the position and motion, respectively. The parameters $a_{11}$, $a_{12}$, $b_1$ and $a_{21}$, $a_{22}$, $b_2$ may be estimated by local motion vector samples using a least squares method, for example.

The fine motion estimation block 110 may comprise suitable logic, circuitry and/or code that may be enabled to refine the motion vectors extracted from the received video stream and decompose the block motion vectors into pixel motion vectors. The fine motion estimation block 110 may be enabled to perform a local refinement search and the motion vectors may be refined to sub-pixel precision, for example. The fine motion estimation block 110 may be enabled to accumulate the plurality of block motion vectors in order to estimate a global motion vector (GMV). The fine motion estimation block 110 may be enabled to sort motion vectors into a histogram and generate the GMV.

The motion compensated interpolation and auto shut-off block 112 may comprise suitable logic, circuitry and/or code that may be enabled to utilize the scaled local and global motion vectors and the decoded and/or received pictures to generate the interpolated or inserted pictures. The pictures may be received from a digital decoder, for example, an MPEG decoder or from an analog source, for example, an NTSC composite signal. The motion compensated interpolation and auto shut-off block 112 may be enabled to generate a plurality of output pictures based on filtering a generated shut-off value, the generated plurality of interpolated pictures and a repeated pixel value. The shut-off value may be generated based on comparison of the calculated difference with one or more cut-off threshold values. A reduced interpolation mode may be utilized in instances where a generated cut-off value may be less than an entry threshold value and/or above an exit threshold value. The cut-off value may be generated based on comparison of the calculated difference with one or more threshold values.

Figure 2A:
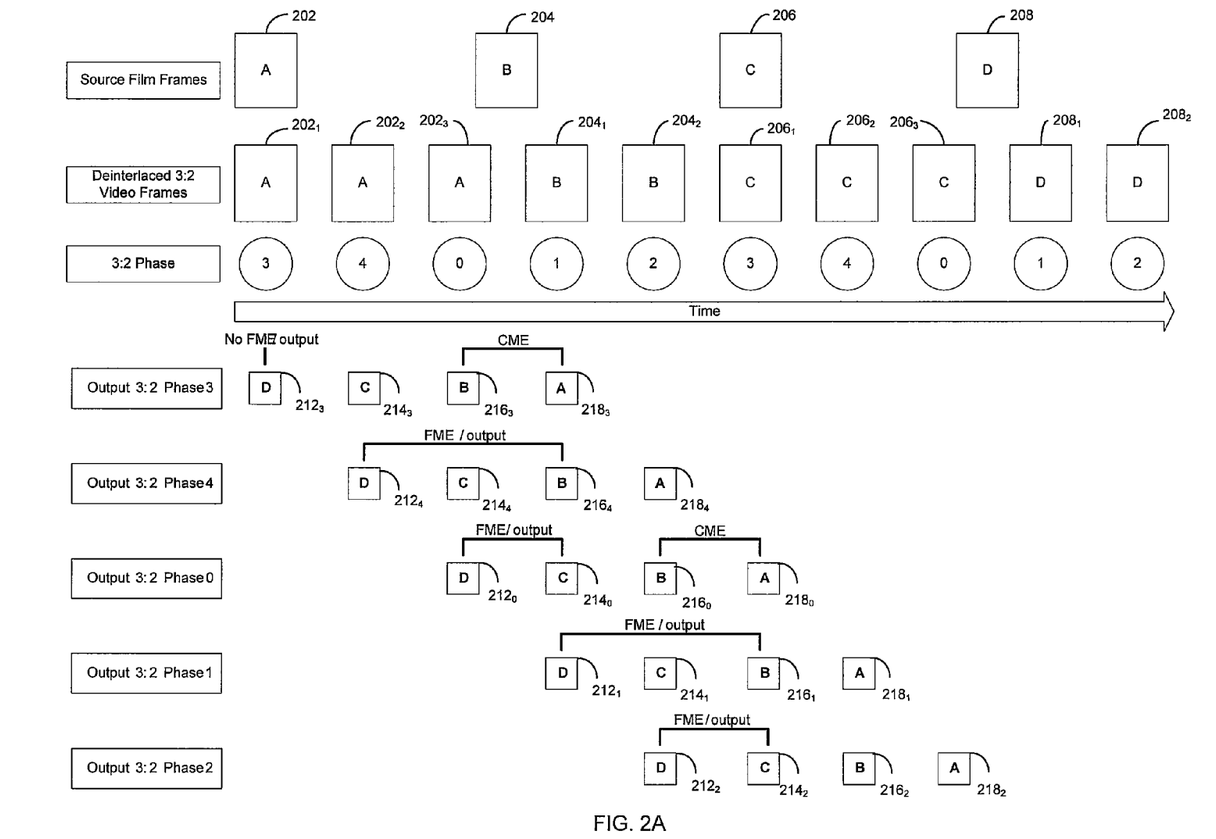
FIG. 2A is a diagram illustrating exemplary 3:2 pulldown that may be utilized for displaying 24 Hz source film at 60 Hz, in accordance with an embodiment of the invention.

FIG. 2A is a diagram illustrating exemplary 3:2 pulldown that may be utilized for displaying 24 Hz source film at 60 Hz, in accordance with an embodiment of the invention. Referring to FIG. 2A, there is shown a plurality of source input frames A 202, B, 204, C 206 and D 208 and a plurality of corresponding deinterlaced 3:2 video frames A $202_1$ in phase 3, A $202_2$ in phase 4, A $202_3$ in phase 0, B $204_1$ in phase 1, B $204_2$ in phase 2, C $206_1$ in phase 3, C $206_2$ in phase 4, C $206_3$ in phase 0, D $208_1$ in phase 1 and D $208_2$ in phase 2. In addition, motion judder processing blocks D $212_3$, C $214_3$, B $216_3$ and A $218_3$ for phase 3; D $212_4$, C $214_4$, B $216_4$ and A $218_4$ for phase 4; D $212_0$, C $214_0$, B $216_0$ and A $218_0$ for phase 0; D $212_1$, C $214_1$, B $216_1$ and A $218_1$ for phase 1; D $212_2$, C $214_2$, B $216_2$ and A $218_2$ for phase 2 are shown. Notwithstanding, the words frame and picture may be utilized interchangeably throughout this disclosure.

The inverse telecine block 114 may be enabled to determine a cadence, for example, 3:2 pulldown and a phase of received progressive input pictures or source input frames A 202, B 204, C 206 and D 208. The inverse telecine block 114 may be enabled to determine a difference between two or more consecutive received progressive input pictures, for example, A 202 and B 204. The inverse telecine block 114 may be enabled to compensate for 24 Hz video in a NTSC source.

Each row of motion judder processing blocks D 212, C 214, B 216 and A 218 represent a window of four 60 Hz frames that are processed by the motion judder cancellation system 100 during a phase. In this regard, there are five phases 0, 1, 2, 3 and 4, one for each 60 Hz frame of a 3:2 pulldown cycle. At each successive phase, the window D 212, C 214, B 216 and A 218 shifts to the right by one 60 Hz frame. Each time the four block window straddles a 60 Hz frame comprising a new 24 Hz source film image such as A 202, B 204, C 206 and/or D 208, the motion judder cancellation system 100 first performs course motion estimation. In addition, for each shift to the right, fine motion estimation may be performed between two blocks comprising different 24 Hz source input frames such as the D 212 block for a given phase and a successive block C 214 or B 216 for the same phase. In this regard, the frames utilized in estimating motion may straddle different input source frames, for example, D212 and C214 may straddle different source input frames and/or D212 and B 216 may straddle different source input frames. For each 3:2 phase, one 60 Hz frame may be output from the motion judder cancellation system 100. Once the MJC system 100 shown in FIG. 1 has locked to the incoming pattern of source input frames, it may know which 3:2 phase it is currently processing (if any) and may therefore know which source input frame is to be considered the successive frame, either C 214 or B 216 (the prior input source frame is always D 212).

In some embodiments of the invention, motion vector interpolation or motion estimation may introduce unwanted visual artifacts within an output image due to ambiguities or errors in determining and representing an object's motion trajectories. Performing motion estimation on fewer frames may reduce the unwanted visual artifacts. In addition, judder may be caused by uneven spacing of output frames. In this regard, judder may be reduced by spacing the output frames evenly at equal or near equal time intervals for display. The invention is not limited to 3:2 pulldown patterns, and may utilize any suitable pulldown pattern, for example, 2:2 pulldown patterns may be utilized.

Figure 2B:
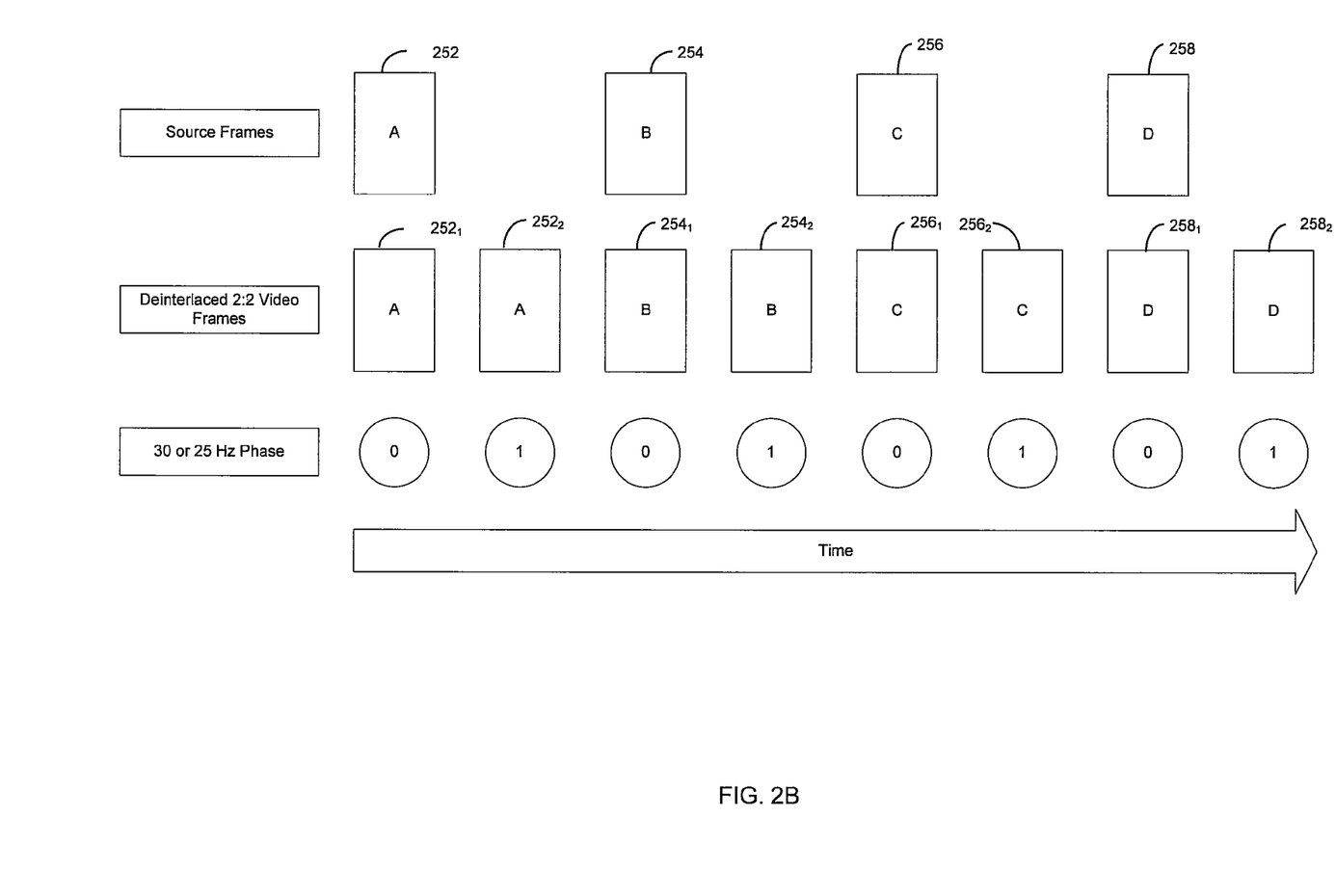
FIG. 2B is a diagram illustrating an exemplary 2:2 pulldown that may be utilized for displaying output video at double the rate of the input source video, in accordance with an embodiment of the invention.

FIG. 2B is a diagram illustrating an exemplary 2:2 pulldown that may be utilized for displaying output video at double the rate of the input source video, in accordance with an embodiment of the invention. Referring to FIG. 2B, there is shown a plurality of source frames A 252, B, 254, C 256 and D 258 and a plurality of corresponding deinterlaced 2:2 video frames A $252_1$ in phase 0, A $252_2$ in phase 1, B $254_1$ in phase 0, B $254_2$ in phase 1, C $256_1$ in phase 0, C $256_2$ in phase 1, D $258_1$ in phase 0 and D $258_2$ in phase 1.

The inverse telecine block 114 may be enabled to determine a cadence, for example, 2:2 pulldown and a phase of received progressive input pictures A 252, B, 254, C 256 and D 258. The inverse telecine block 114 may be enabled to determine a difference between two or more consecutive received progressive input pictures, for example, A 252 and B, 254. The inverse telecine block 114 may be enabled to compensate for 30 Hz video in a NTSC source or 25 Hz video in a phase alternation line (PAL) source. In this regard, the 2:2 pulldown pattern may be utilized for FIG. 2B is a diagram illustrating an exemplary 2:2 pulldown may be utilized for displaying 30 Hz input source video at 60 Hz or 25 Hz input source video at 50 Hz.

Figure 3A:
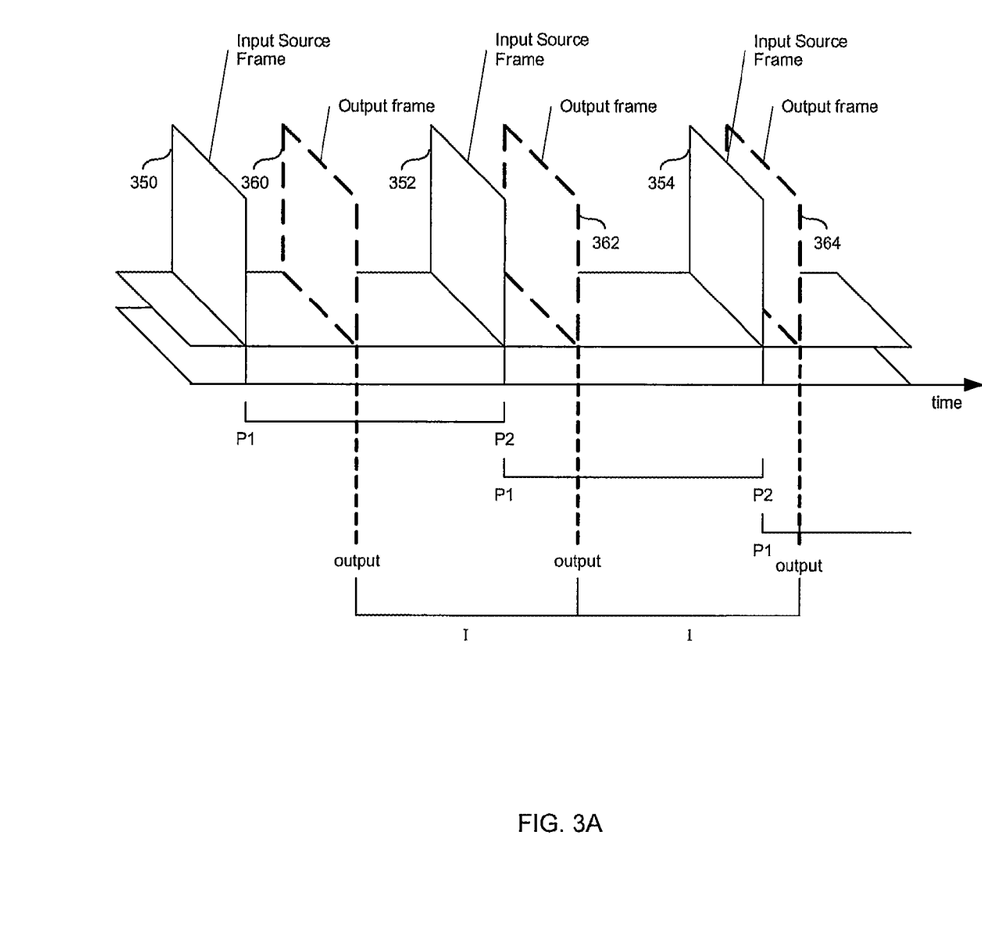
FIG. 3A is a block diagram illustrating successive temporally equidistant output frames, in accordance with an embodiment of the invention.

FIG. 3A is a block diagram illustrating successive temporally equidistant output frames, in accordance with an embodiment of the invention. Referring to FIG. 3A there are shown three source input frames 350, 352 and 354 as well as three output frames 360, 362 and 364. In some embodiments of the invention, temporal distance between successive output frames 360, 362 and 364 may be based on the ratio of the rate of the source input frames 350, 352 and 354 and a rate of the output frames 360, 362 and 364.

$$I_2 = r_1(P2-P1)/r_2$$

where $I_2$ may be the time interval between output frames, P2−P1 may be the time interval between source input frames P1 and P2, $r_1$ may be the rate of the source input frames and $r_2$ is the rate of the output frames. For example, for a source input frame rate of 24 Hz and an output frame rate of 60 Hz, the interval between output frames may be ⅖ or 0.4 times the time interval between source input frames P1 and P2. In some embodiments of the invention, a plurality of output frames may be temporally placed between two consecutive source input frames.

Figure 3B:
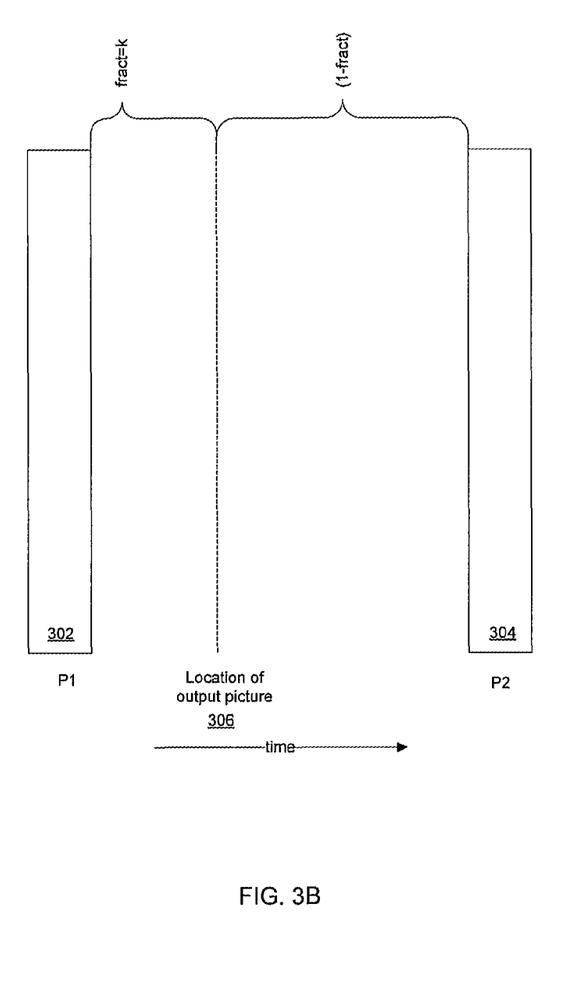
FIG. 3B is a block diagram illustrating the relative position of an output frame measured from a prior source input frame, in accordance with an embodiment of the invention.

FIG. 3B is a block diagram illustrating the relative position of an output frame measured from a prior source input frame, in accordance with an embodiment of the invention. Referring to FIG. 3B, there is shown a plurality of source input frames, for example, a previous source input frame P1 302 and a next source input frame P2 304 wherein P1 302 and P2 304 may be substantially the same as source input frames A 202, B 204, C 206 and/or D 208 described in FIG. 2A or A 252, B 254, C 256 and/or D 258 shown in FIG. 2B. The location of an output frame 306 is also shown.

The output frame 306 may be located k time units, referred to as a frame fraction, from the previous source input frame P1 302 wherein k time units may represent a fraction of the time interval between source input frames P1 302 and P2 304. The fractional time unit k may be determined based on the rate of output frames. In some embodiments of the invention, a plurality of output frames may be temporally placed between two consecutive source input frames P1 302 and P2 304.

Figure 4:
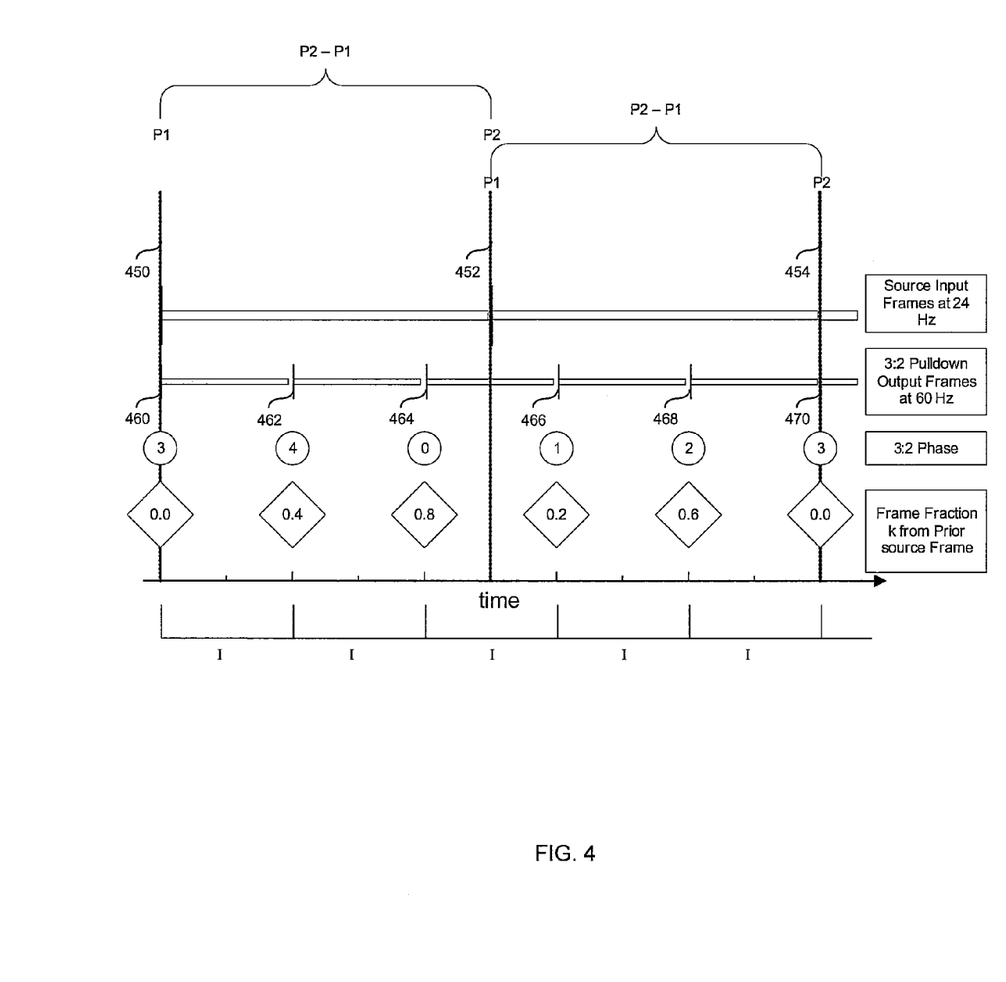
FIG. 4 is a block diagram illustrating exemplary output frame fractions for each phase of a 3:2 pulldown pattern, in accordance with an embodiment of the invention.

FIG. 4 is a block diagram illustrating exemplary output frame fractions for each phase of a 3:2 pulldown pattern, in accordance with an embodiment of the invention. Referring to FIG. 4, there are shown three source input frames 450, 452 and 454 and six output frames 460, 462, 464, 466, 468 and 470.

In this embodiment of the invention, the source input frames 450, 452 and 454 may have a rate of 24 Hz and a time interval of P2−P1 between frames. The output frames 460, 462, 464, 466, 468 and 470 may have a rate of 60 Hz. The output frames 460, 462, 464, 466, 468 and 470 may be deinterlaced frames or may be original source frames. FIG. 4 comprises one complete cycle of 3:2 pulldown comprising a sequence of five output frames 460, 462, 464, 466 and 468 and/or comprising five phases 0, 1, 2, 3 and 4. For each phase, the corresponding output frame may be placed temporally at a specified frame fraction from the prior source input frame such that the output frames may be spaced at equidistant time intervals. Output frames that are temporally coincident with a source input frame may not undergo motion vector interpolation while output frames occurring between source input frames may undergo motion vector interpolation. In this embodiment of the invention, the output frames 460, 462, 464, 466, 468 and 470 may be spaced at an interval that is a fraction of the source input frame interval, for example, I=0.4 (P2−P1). The position of the output frames 460, 462, 464, 466, 468 and 470 relative to the position of the source input frames 450, 452 and 454 may be determined by temporally placing them a frame fraction distance from the prior input source frame. For example, at 3:2 pulldown phase 3, the output frame 460 may be temporally coincident with the source frame 450. At 3:2 pulldown phase 4, the output frame 462 may be temporally placed at 0.4 times the source input frame interval (P2−P1) after the source input frame 450. At 3:2 pulldown phase 0, the output frame 464 may be temporally placed at 0.8 times the source input frame interval (P2−P1) after the source input frame 450. At 3:2 pulldown phase 1, the output frame 466 may be temporally placed at 0.2 times the source input frame interval (P2−P1) after the source input frame 452. At 3:2 pulldown phase 2, the output frame 468 may be temporally placed at 0.6 times the source input frame interval (P2−P1) after the source input frame 454. At output frame 470, a new cycle of 3:2 pulldown begins with phase 3 and the pattern of frame fractions may repeat. In this embodiment of the invention the output frame 460 at phase 3 may be the same as the source input frame 450. Output frames 462, 464, 466 and 468 may based on motion vector interpolation processing so that four out of five output frames in the 3:2 cycle are motion vector interpolated. This scheme may be referred to as "4 of 5 interpolation" and may provide better judder reduction performance; but with 4 out of every 5 frames motion vector interpolated, unwanted artifacts that are present may be more visible. Table 1 may enable a process for "4 of 5 interpolation" on 3:2 pulldown frames.

TABLE 1

Frame Fraction and Blend Mode For
3:2 Pull-down and "4 of 5 Interpolation"

| 3:2 phase | Frame Fraction | BLEND_MODE_SEL |
| --- | --- | --- |
| 0 | 0.8 | MOTION_COMPENSATE |
| 1 | 0.2 | MOTION_COMPENSATE |
| 2 | 0.6 | MOTION_COMPENSATE |
| 3 | 0.0 | FORCE_ORIGINAL |
| 4 | 0.4 | MOTION_COMPENSATE |

Table 1 shows the frame fraction and blend mode selected for each of the 3:2 phases in a "4 of 5 interpolation" mode. The BLEND_MODE_SEL column may indicate programmable information for each phase. When set to MOTION_COMPENSATE, the MJC may perform its full motion vector search and compensation at a temporal location given by the frame fraction. When set to FORCE_ORIGINAL, the MJC may ignore the frame fraction and output, unmodified, the source input frame indicated by D 212 in the MJC. There may be two additional options for blend mode processing indicated in a BLEND_MODE_SEL column. Blend mode FORCE_NEXT may cause the MJC to ignore the frame fraction and output, unmodified, P2 (indicated by block C 214 or B 216 in the MJC depending on the current phase). In addition, the blend mode BLEND may cause the MJC to blend source input frames P1 and P2 on a zero motion pixel by pixel basis with a blend ratio given by the frame fraction. For example, for a frame fraction of 0.4, the blend may comprise 60 percent of the prior source input frame and 40 percent of the successive source input frame. In some embodiments of the invention, the blend mode may be modified wherein the number of phases undergoing motion vector interpolation is reduced.

By offsetting and/or rounding the frame fractions, the uniform temporal spacing of the output frames in the "4 of 5 Interpolation" scheme may be approximated while enabling more frames in the 3:2 pull down cycle to be original source input frames that are not motion interpolated. This may enable trading some judder for reduced visible artifacts.

TABLE 2

Frame Fraction And Blend Mode For
3:2 Pulldown and "3 of 5 Interpolation"

| 3:2 phase | Frame Fraction | BLEND_MODE_SEL |
|---|---|---|
| 0 | 0.7 | MOTION_COMPENSATE |
| 1 | 0.0 | FORCE_ORIGINAL |
| 2 | 0.5 | MOTION_COMPENSATE |
| 3 | 0.0 | FORCE_ORIGINAL |
| 4 | 0.3 | MOTION_COMPENSATE |

Table 2 shows an embodiment of a "3 of 5 interpolation" scheme. The frame fractions from Table 1 may be offset by a value of 0.1 in a negative direction and may be rounded or quantized to 0.0 for a frame fraction within a range of 0.1. In this regard, a motion vector interpolation that is only 10% towards one frame and 90% towards the other may be approximated to be an output frame that is 100% of the closest source input frame (i.e. an original picture as indicated by a blend mode of FORCE_ORIGINAL). The "3 of 5 interpolation" scheme enables an additional output frame in the 3:2 pulldown cycle to be original. With only 3 of the 5 output frames motion compensated, unwanted artifacts may be less visible as compared to the "4 of 5 interpolation" scheme. The invention is not limited to a specific offset value and/or rounding (quantizing) range and may comprise any suitable offset value or rounding (quantizing) range. In some embodiments of the invention, a frame fraction may be rounded down or quantized to a prior source input frame P1 as indicated by a blend mode of FORCE_ORIGINAL. In addition, a frame fraction may be rounded or quantized up to a successive frame P2 as indicated by the blend mode FORCE_NEXT.

Table 3 shows one embodiment of a "2 of 5 interpolation" scheme wherein two output frames are motion vector interpolated and three output frames are original source input frames. In this scheme frame fractions may be been further offset and/or rounded such that an additional phase may output an original source input frame rather than a motion vector interpolated frame.

TABLE 3

Frame Fraction And Blend Mode For
3:2 Pulldown and "2 of 5 Interpolation"

| 3:2 phase | Frame Fraction | BLEND_MODE_SEL |
|---|---|---|
| 0 | 0.6 | MOTION_COMPENSATE |
| 1 | 0.0 | FORCE_ORIGINAL |
| 2 | 0.4 | MOTION_COMPENSATE |
| 3 | 0.0 | FORCE_ORIGINAL |
| 4 | 0.0 | FORCE_ORIGINAL |

In operation, the information in tables 1, 2 and/or 3 may be programmed into hardware and/or software within the MJC such that a specified blend mode and/or frame fraction may be utilized in processing and outputting frames for a specified 3:2 pulldown phase. It may be noted that the invention is not limited to any specific frame fraction and/or blend mode and may utilize any suitable combination thereof. Moreover the invention is not limited to utilizing any specific pulldown pattern and in some embodiments of the invention, may not comprise a pulldown process.

Figure 5:
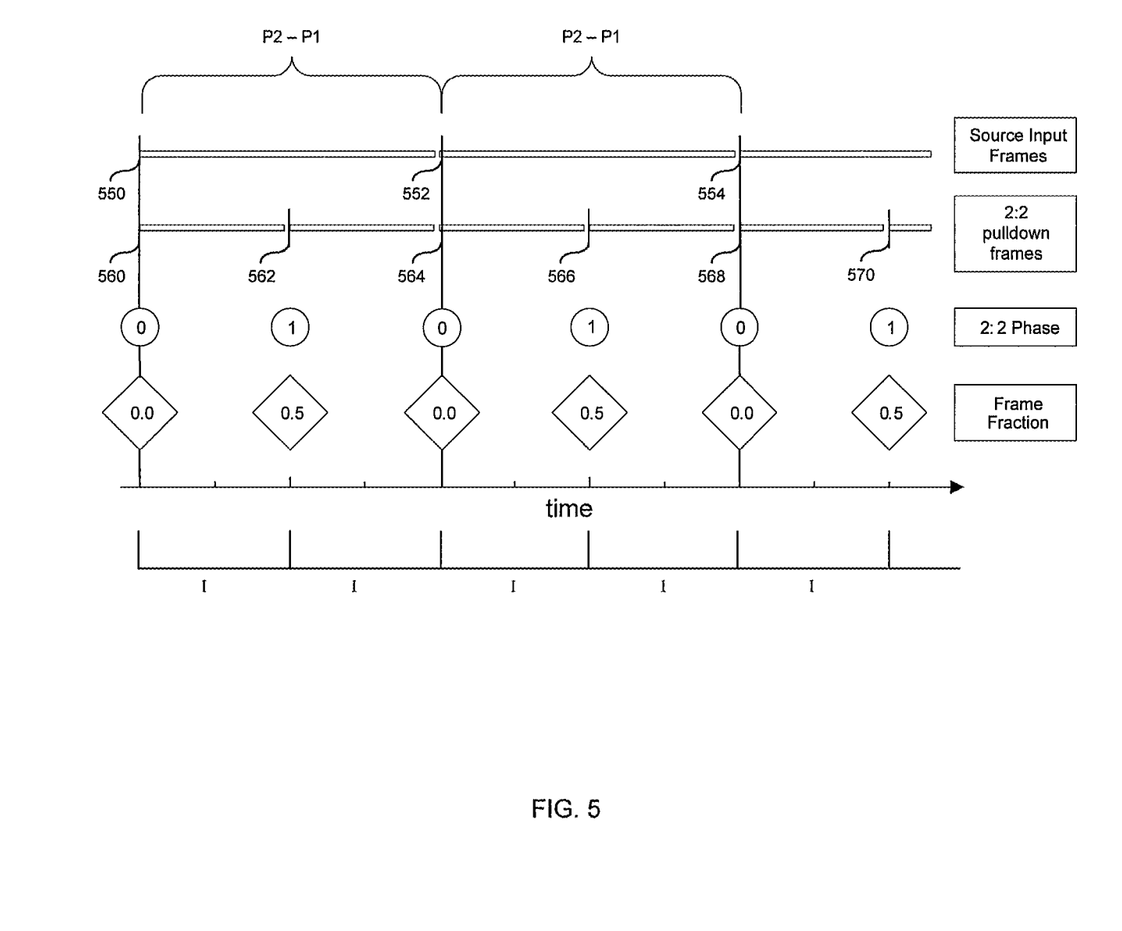
FIG. 5 is a block diagram illustrating exemplary output frame fractions for each phase of a 2:2 pulldown pattern, in accordance with an embodiment of the invention.

FIG. 5 is a block diagram illustrating exemplary output frame fractions for each phase of a 2:2 pulldown pattern, in accordance with an embodiment of the invention. Referring to FIG. 5 there are shown three source input frames 550, 552 and 554 and seven output frames 560, 562, 564, 566, 568 and 570.

The source input frames 550, 552 and 554 may have a rate half that of the output frames 560, 562, 564, 566, 568 and 570 and may have a time interval of P2–P1 between frames. FIG. 5 comprises two complete cycles of a 2:2 pulldown wherein each cycle comprises 2 frames and/or two phases 0 and 1. For each phase, the corresponding output frame may be placed temporally at a specified frame fraction from the prior source input frame such that the output frames may be spaced at equidistant time intervals. Output frames that are temporally coincident with a source input frame may not undergo motion vector interpolation while output frames occurring between source input frames may undergo motion vector interpolation. In this embodiment of the invention, the output frames 560, 562, 564, 566, 568 and 570 may be spaced at an interval I that is a fraction of the source input frame interval, for example:

$$I = 0.5(P2-P1)$$

where P1 may be the temporal position of a first source input frame and P2 may be the temporal position of a successive source input frame. The position of the output frames 560, 562, 564, 566, 568 and 570 relative to the position of the source input frames 550, 552 and 554 may be determined by temporally placing each of them a frame fraction distance from a prior input source frame. For example, at 2:2 pulldown phase 0, the output frame 560 may be temporally coincident with the source frame 550. At 2:2 pulldown phase 1, the output frame 562 may be temporally placed at 0.5 times the source input frame interval (P2–P1) after the source input frame 550. At output frame 564, a new cycle of 2:2 pulldown may begin with phase 0 and the pattern of frame fractions may repeat. In this embodiment of the invention the output frame 560 at phase 0 may comprise the same image as the source input frame 550. Output frames 562, 566 and 570 may based on motion vector interpolation processing so that one out of two output frames in the 2:2 pulldown cycle may be motion vector interpolated. This scheme may be referred to as "1 of 2 interpolation". Table 4 may enable a process for "1 of 2 interpolation" on 2:2 pulldown frames.

TABLE 4

Frame Fraction and Blend Mode for
2:2 Pulldown and "1 of 2 Interpolation"

| 2:2 phase | Frame Fraction | BLEND_MODE_SEL |
|---|---|---|
| 0 | 0.0 | FORCE_ORIGINAL |
| 1 | 0.5 | MOTION_COMPENSATE |

Figure 6:
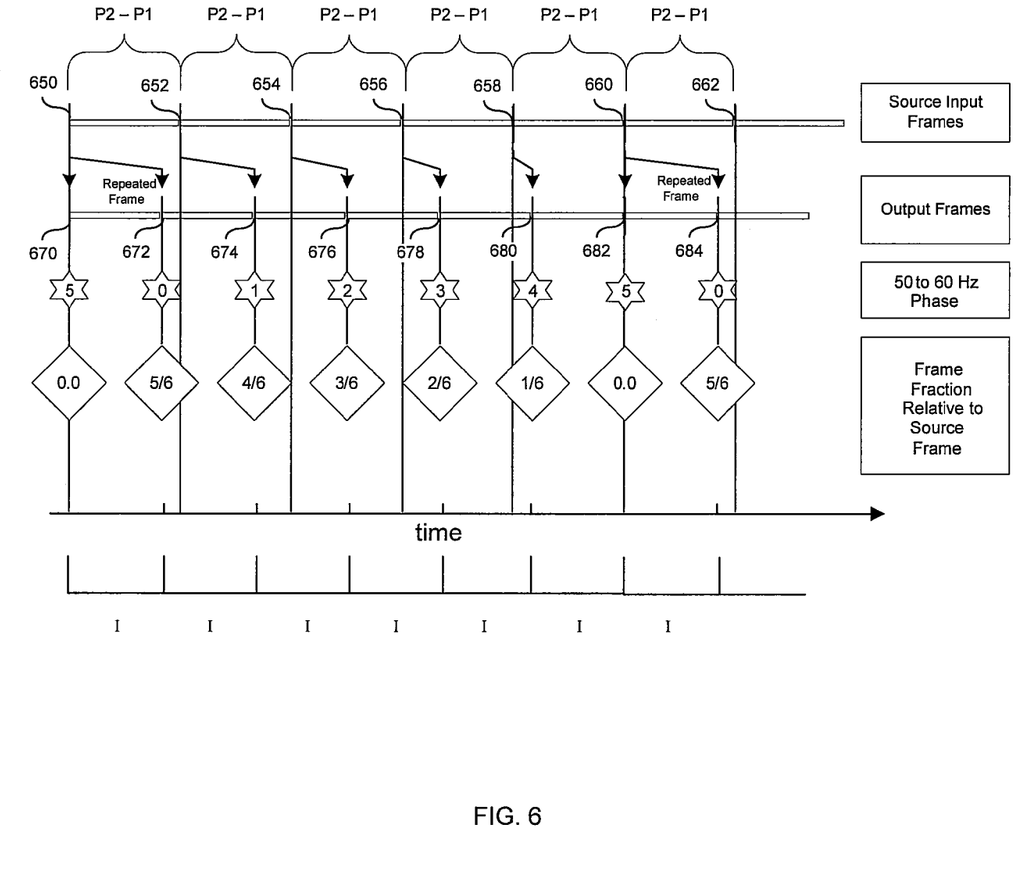
FIG. 6 is a block diagram illustrating exemplary output frame fractions for each state of a 50 Hz to 60 Hz input to output conversion, in accordance with an embodiment of the invention.

FIG. 6 is a block diagram illustrating exemplary output frame fractions for each state of a 50 Hz to 60 Hz input to output conversion, in accordance with an embodiment of the invention. Referring to FIG. 6 there are shown seven source input frames 650, 652, 654, 656, 658, 660 and 662 as well as eight output frames 670, 672, 674, 676, 678, 680, 682 and 684.

In some embodiments of the invention, the source input frames 650, 652, 654, 656, 658, 660 and 662 may have a rate of 50 Hz and a time interval of P2–P1 between frames. The output frames 670, 672, 674, 676, 678, 680, 682 and 684 may have a rate of 60 Hz. The MJC may read the 50 Hz frames at 60 Hz and may receive and/or insert a repeated frame after every five source frames. Accordingly, a cycle of output frames may comprise six states 0, 1, 2, 3, 4 and 5. The state for the repeated frame may be identified as state 0. For each state, the corresponding output frame may be placed temporally at a specified frame fraction from the prior source input frame such that the output frames may be spaced at equidistant time intervals. Accordingly, the interval I between output frames may be a fraction 5/6 of the interval between source input frames P2–P1.

$$I=5(P2-P1)/6$$

Output frames that are temporally coincident with a source input frame may not undergo motion vector interpolation while output frames occurring between source input frames may undergo motion vector interpolation. In this regard, the output frame 670 of state five may be temporally coincident with the source input frame 650. The position of an output frame relative to the position of a corresponding source input frame may be determined by temporally placing the output frame a frame fraction distance from the prior input source frame. For example, at state 0, the repeated output frame 672 may be temporally placed at 5/6 times the source input frame interval (P2–P1) after the source input frame 650. At state 1, the output frame 674 may be temporally placed at 4/6 times the source input frame interval (P2–P1) after the source input frame 652. At state 2, the output frame 676 may be temporally placed at 3/2 times the source input frame interval (P2–P1) after the source input frame 654. At state 3, the output frame 678 may be temporally placed at 2/6 times the source input frame interval (P2–P1) after the source input frame 656. At state 4, the output frame 680 may be temporally placed at 1/6 times the source input frame interval (P2–P1) after the source input frame 658. At output frame 682, a new cycle may begin with state 5 and the pattern of frame fractions may repeat. Output frames 672, 674, 676, 678, 680 and 684 may based on motion vector interpolation processing so that five out of six output frames in a cycle may motion vector interpolated. This scheme may be referred to as "5 of 6 interpolation". Table 5 comprises frame fractions and blend modes that may enable programming MJC hardware and/or software for 50 Hz to 60 Hz conversion with "5 of 6 interpolation".

TABLE 5

Frame Fraction and Blend Mode for 50 to 60 Hz "5 of 6 Interpolation"

| 50 to 60 Hz state | Frame Fraction | BLEND_MODE_SEL |
|---|---|---|
| 0 | 5/6 | MOTION_COMPENSATE |
| 1 | 4/6 | MOTION_COMPENSATE |
| 2 | 3/6 | MOTION_COMPENSATE |
| 3 | 2/6 | MOTION_COMPENSATE |
| 4 | 1/6 | MOTION_COMPENSATE |
| 5 | 0 | FORCE_ORIGINAL |

In a manner similar to the 3:2 pulldown interpolation reduction schemes, Table 6 comprises frame fractions and blend modes that may enable programming of hardware and/or software for 50 Hz to 60 Hz conversion with a "3 of 6 interpolation" scheme wherein three of the six output frames in a cycle may be motion vector interpolated and three may be unmodified relative to the corresponding source input frames.

TABLE 6

Frame Fraction and Blend Mode for 50 to 60 Hz Conversion and "3 of 6 Interpolation"

| 50 to 60 Hz state | Frame Fraction | BLEND_MODE_SEL |
|---|---|---|
| 0 | 1 | FORCE_NEXT |
| 1 | 4/6 | MOTION_COMPENSATE |
| 2 | 3/6 | MOTION_COMPENSATE |

TABLE 6-continued

Frame Fraction and Blend Mode for 50 to 60 Hz Conversion and "3 of 6 Interpolation"

| 50 to 60 Hz state | Frame Fraction | BLEND_MODE_SEL |
|---|---|---|
| 3 | 2/6 | MOTION_COMPENSATE |
| 4 | 0 | FORCE_ORIGINAL |
| 5 | 0 | FORCE_ORIGINAL |

In this embodiment of the invention, a portion of the output frames may be shifted to a frame fraction that may be temporally coincident with a source input frame where an unmodified source input frame may be utilized rather than a motion vector compensated frame. For example, in state 0, the output frame may be assigned a frame fraction of 1 rather than 5/6. In this regard the output frame may be shifted to the position of the successive source input frame as indicated by the FORCE_NEXT blend mode in column BLEND_MODE_SEL. States 1, 2 and 3 may utilize the same frame fractions shown in Table 5. However, states 4 and 5 may be assigned a frame fraction of 0 such that the corresponding output frames may be temporally coincident with the prior source input frames as indicated by the FORCE_ORIGINAL blend mode in the BLEND_MODE_SEL column. The invention is not limited to any specific frame fraction and/or blend mode and may utilize any suitable frame fraction and or blend mode.

Figure 7:
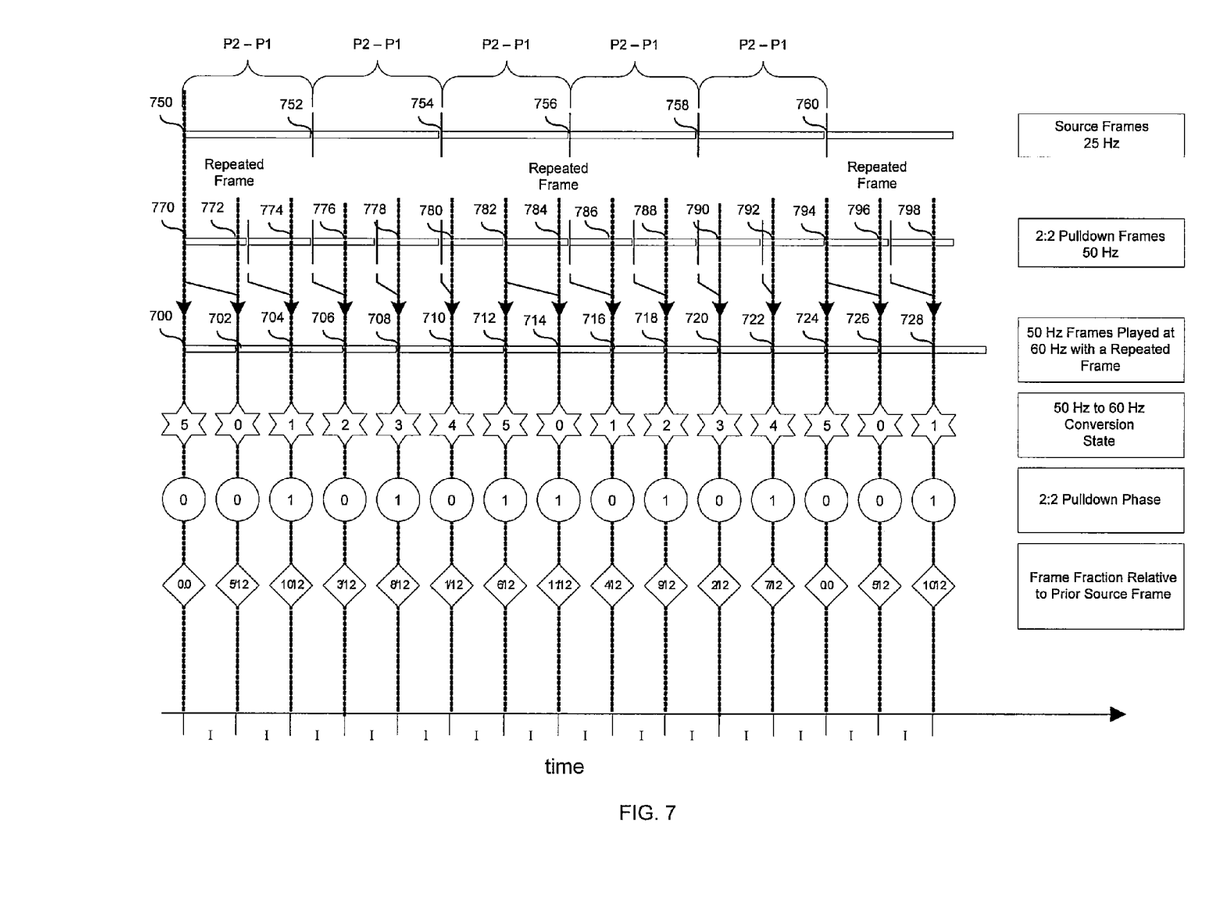
FIG. 7 is a block diagram illustrating exemplary 25 Hz to 60 Hz conversion utilizing 2:2 pulldown and 50 Hz to 60 Hz conversion, in accordance with an embodiment of the invention.

FIG. 7 is a block diagram illustrating exemplary 25 Hz to 60 Hz conversion utilizing 2:2 pulldown and 50 Hz to 60 Hz conversion, in accordance with an embodiment of the invention. Referring to FIG. 7, there are shown six source input frames 750, 752, 754, 756, 758, 760, fifteen 2:2 pulldown frames 770, 772, 774, 776, 778, 780, 782, 784, 786, 788, 790, 792, 794, 796 and 789, and fifteen 50 Hz to 60 Hz conversion output frames 700, 702, 704, 706, 708, 710, 712, 714, 716, 718, 720, 722, 724, 726 and 728.

The source input frames 750, 752, 754, 756, 758, 760 may have a rate of 25 Hz with a time interval of P2–P1 between frames. The source input frames may undergo a 2:2 pulldown process and the resulting 2:2 pulldown frames 770, 772, 774, 776, 778, 780, 782, 784, 786, 788, 790, 792, 794, 796 and 789 may have a rate of 50 Hz. The 2:2 pulldown frames may be deinterlaced or may comprise original source frames. Moreover, the 2:2 pulldown frames may be sped up to 60 Hz and a frame may be repeated after every five 2:2 pulldown frames such that images comprised within the resulting frames at 60 Hz may not appear to be sped up. A cycle of motion vector interpolation may comprise a sequence of twelve 60 Hz frames with an even interval between frames of I=5(P2–P1)/12. FIG. 7 comprises one complete cycle of 60 Hz frames wherein six states 0, 1, 2, 3, 4 and 5 and two phases 0 and 1 correspond to frame fractions. For example, state 5, phase 0 corresponds to a frame fraction of 0.0, state 0, phase 0 corresponds to a frame fraction of 5/12, state 1, phase 1 corresponds to a frame fraction of 10/12 and so on. For each state/phase combination, the corresponding output frame may be placed temporally at a specified frame fraction from the prior source input frame such that the output frames may be spaced at equidistant time intervals I. Output frames that are temporally coincident with a source input frame may not undergo motion vector interpolation while output frames occurring between source input frames may undergo motion vector interpolation. 60 Hz output frames 702, 704, 706, 708, 710, 712, 714, 716, 718, 720 and 722 may based on motion vector interpolation processing while output frame 700 may comprise an unmodified source frame image such that eleven out of twelve output frames may be motion vector interpolated. This scheme may be referred to as "11 of 12 interpolation". Table 7 may comprise frame fractions and blend modes that may enable programming of hardware and/or software for converting a 25 Hz source input stream to a 60 Hz output stream utilizing 2:2 pulldown and/or an "11 of 12 interpolation" scheme. In this regard, eleven frames per cycle may be motion vector interpolated while 60 to 60 Hz State, 2:2 pulldown phase 0 may be unmodified and may be placed temporally coincident with the corresponding source input frame.

TABLE 7

Frame Fraction and Blend Mode for 25 Hz to 60 Hz conversion, 2:2 pulldown and "11 of 12 Interpolation"

| 50 to 60 Hz state | 2:2 pulldown phase | Frame Fraction | BLEND_MODE_SEL |
|---|---|---|---|
| 0 | 0 | 5/12 | MOTION_COMPENSATE |
| 1 | 1 | 10/12 | MOTION_COMPENSATE |
| 2 | 0 | 3/12 | MOTION_COMPENSATE |
| 3 | 1 | 8/12 | MOTION_COMPENSATE |
| 4 | 0 | 1/12 | MOTION_COMPENSATE |
| 5 | 1 | 6/12 | MOTION_COMPENSATE |
| 0 | 1 | 11/12 | MOTION_COMPENSATE |
| 1 | 0 | 4/12 | MOTION_COMPENSATE |
| 2 | 1 | 9/12 | MOTION_COMPENSATE |
| 3 | 0 | 2/12 | MOTION_COMPENSATE |
| 4 | 1 | 7/12 | MOTION_COMPENSATE |
| 5 | 0 | 0 | FORCE_ORIGINAL |

In a manner similar to the 3:2 pulldown interpolation reduction schemes, described in FIG. 4, Table 1 and Table 2, Table 8 may comprise frame fractions and blend modes that may enable programming of hardware and/or software for converting a 25 Hz source input stream to a 60 Hz output stream utilizing a "7 of 12 interpolation" scheme wherein seven of the twelve output frames per cycle may be motion vector interpolated and three may be unmodified relative to the corresponding source input frames. For example, output frames corresponding to 50 to 60 Hz state 1, 2:2 pulldown phase 1 and 50 to 60 Hz state 0, 2:2 pulldown phase 1 may comprise an unmodified successive source image corresponding to P2 as indicated by blend mode FORCE_NEXT. In addition, 50 to 60 Hz state 4, 2:2 pulldown phase 0 and 50 to 60 Hz state 3, 2:2 pulldown phase 0 and 50 to 60 Hz state 5, 2:2 pulldown phase 0 may comprise an unmodified source image corresponding to a prior frame P1 as indicated by blend mode FORCE_ORIGINAL. The remaining seven frames per cycle may be motion vector interpolated. The invention is not limited to any specific frame fraction and/or blend mode and may utilize any suitable frame fraction and or blend mode.

TABLE 8

Frame Fraction and Blend Mode for 25 Hz to 60 Hz conversion, 2:2 pulldown and "7 of 12 Interpolation"

| 50 to 60 Hz state | 2:2 pulldown phase | Frame Fraction | BLEND_MODE_SEL |
|---|---|---|---|
| 0 | 0 | 5/12 | MOTION_COMPENSATE |
| 1 | 1 | 1 | FORCE_NEXT |
| 2 | 0 | 3/12 | MOTION_COMPENSATE |
| 3 | 1 | 8/12 | MOTION_COMPENSATE |
| 4 | 0 | 0 | FORCE_ORIGINAL |
| 5 | 1 | 6/12 | MOTION_COMPENSATE |
| 0 | 1 | 1 | FORCE_NEXT |
| 1 | 0 | 4/12 | MOTION_COMPENSATE |
| 2 | 1 | 9/12 | MOTION_COMPENSATE |

TABLE 8-continued

Frame Fraction and Blend Mode for 25 Hz to 60 Hz conversion, 2:2 pulldown and "7 of 12 Interpolation"

| 50 to 60 Hz state | 2:2 pulldown phase | Frame Fraction | BLEND_MODE_SEL |
|---|---|---|---|
| 3 | 0 | 0 | FORCE_ORIGINAL |
| 4 | 1 | 7/12 | MOTION_COMPENSATE |
| 5 | 0 | 0 | FORCE_ORIGINAL |

Figure 8:
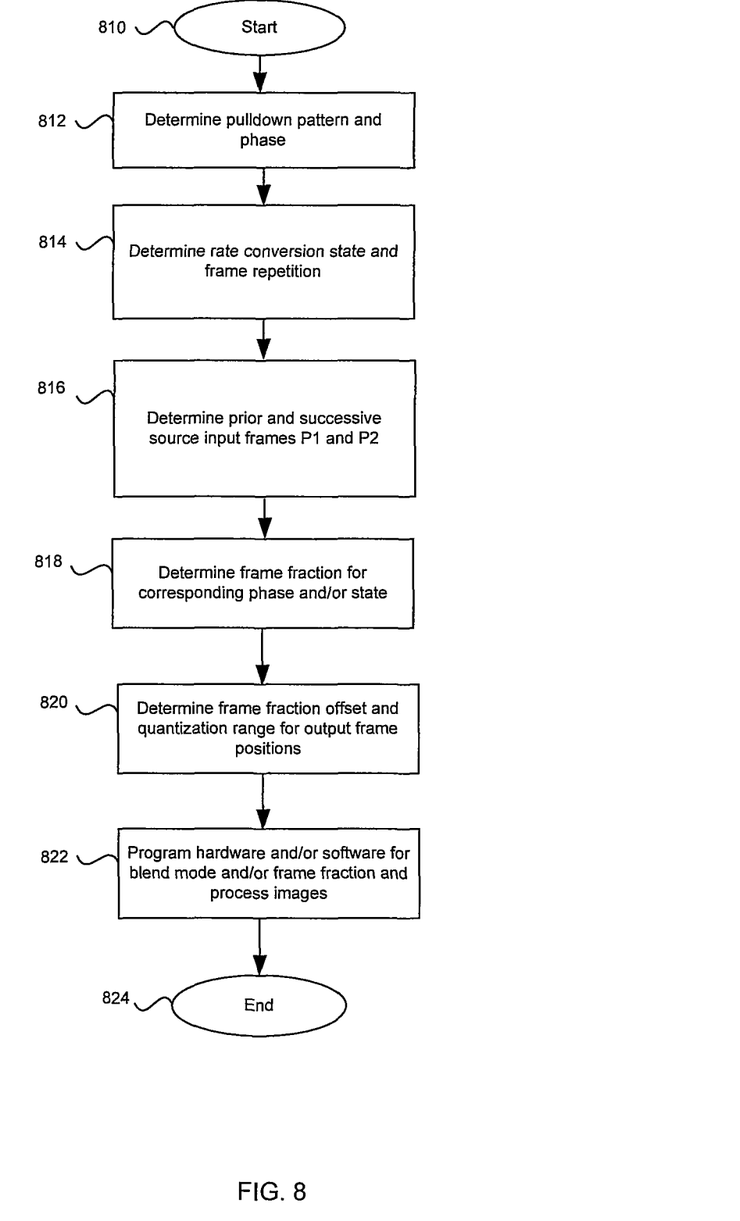
FIG. 8 is a flow chart that illustrates exemplary steps for selecting interpolation and frame fraction as a means for trading off judder against interpolation artifacts, in accordance with an embodiment of the invention.

FIG. 8 is a flow chart that illustrates exemplary steps for selecting interpolation and frame fraction as a means for trading off judder against interpolation artifacts, in accordance with an embodiment of the invention. Referring to FIG. 8, there is shown a flow chart wherein step 810 refers to the beginning of a rate conversion and motion smoothing process. In step 812, motion judder cancellation system 100 may determine a pull down pattern and phase of one or more source input frames such as 750, 752, 754, 756, 758, 760 described in FIG. 7. In step 814, the motion judder cancellation system 100 may determine a rate conversion and/or may repeat one or more frames. In step 816, motion judder cancellation system 100 may determine prior source input frames and successive source input frames P1 and P2. In step 818, the motion judder cancellation system 100 may determine frame fractions for corresponding phases and/or states. In step 820, a frame fraction offset and/or range for rounding or quantizing output frame position may be determined. In step 822, hardware and/or software may be programmed for frame fractions and blend modes corresponding to output frame phases and/or output frame states and frames may be processed. Step 820, is an end step.

In some embodiments of the invention, the motion judder cancellation system 100 may determine a source frame repetition pattern within a sequence of source frames. Temporal positions for output frames may be determined based on temporal position of a source frame. In addition, temporal positions for the output frames may be based on a fraction of an interval between a corresponding prior source frame and a different successive source frame. For each output frame, an image blend mode such as motion vector interpolation may be determined. The determined image blend mode may be modified for one or more of the output frames. Accordingly, output frames may be generated at a determined rate based on the determined temporal position and determined image blend mode. The temporal positions of generated output frames may be spaced at even intervals. Notwithstanding, in some embodiments of the invention, the output frame spacing may be modified for one or more output frames in a sequence based on adding or subtracting an offset to the fraction of an interval between a corresponding prior source frame and a successive different source frame. Moreover, the determined image blend mode may be modified for the time shifted output frames. Generation of output frames may be programmed within the motion judder cancellation system 100 according to determined and/or modified temporal positions and image blend modes. In some embodiments of the invention, a rate of source frames may be increased and one or more repeated source frames may be inserted into a sequence of source frames.

Certain embodiments of the invention may comprise a machine-readable storage having stored thereon, a computer program having at least one code section for selecting interpolation as a means of trading off judder against interpolation artifacts, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for image processing, the method comprising:
    determining temporal positions for output frames based at least in part on a fraction of an interval between a corresponding prior source frame and a successive different source frame in a plurality of source input frames;
    determining an image blend mode for each of said output frames according to a pulldown phase determined from the plurality of source input frames and the fraction;
    determining a fraction offset and a rounding range based at least in part on the determined image blend mode for each of said output frames; and
    generating said output frames based at least in part on said determined temporal positions, said image blend mode, said fraction offset, and said rounding range.

2. The method according to claim 1, comprising temporally spacing said generated output frames at evenly spaced positions.

3. The method according to claim 2, comprising modifying said temporal positions of generated output frames based at least in part on the determined offset for the fraction of said interval between said corresponding prior source frame and said successive different source frame for one or more output frames within a sequence.

4. The method according to claim 3, comprising modifying said determined image blend mode for one or more of said output frames comprising said modified temporal spacing.

5. The method according to claim 1, comprising programming said generation of said output frames based at least in part on said determined image blend mode and said determined temporal position for said corresponding output frames.

6. The method according to claim 1, comprising increasing a rate of said source frames and inserting one or more repeated ones of said source frames within a sequence of source frames.

7. The method according to claim 1, comprising modifying said determined image blend mode for one or more of said generated output frames.

8. The method according to claim 1, comprising determining a source frame repetition pattern within a sequence of frames.

9. A system for image processing, the system comprising:
    one or more circuits operable to, at least:
        determine temporal positions for output frames based at least in part on a fraction of an interval between a corresponding prior source frame and a successive different source frame in a plurality of source input frames;
        determine an image blend mode for each said output frames according to a pulldown phase determined from the plurality of source input frames and the fraction;
        determine a fraction offset and a rounding range for each of said output frames; and
        generate said output frames based at least in part on said determined temporal positions, said image blend mode, said fraction offset, and said rounding range.

10. The system according to claim 9, wherein said one or more circuits enables temporally spacing said generated output frames at evenly spaced positions.

11. The system according to claim 10, wherein said one or more circuits enables modification of said temporal positions of generated output frames based at least in part on the determined offset for the fraction of said interval between said corresponding prior source frame and said successive different source frame for one or more output frames within a sequence.

12. The system according to claim 11, wherein said one or more circuits enables modification of said determined image blend mode for one or more of said output frames comprising said modified temporal spacing.

13. The system according to claim 9, wherein said one or more circuits enables programming of said generation of said output frames based at least in part on said determined image blend mode and said determined temporal position for said corresponding output frames.

14. The system according to claim 9, wherein said one or more circuits enables increasing a rate of said source frames and insertion of one or more repeated ones of said source frames within a sequence of source frames.

15. The system according to claim 9, wherein said one or more circuits enables modification of said determined image blend mode for one or more of said generated output frames.

16. The system according to claim 9, wherein said one or more circuits enables determination of a source frame repetition pattern within a sequence of frames.

17. A non-transitory machine-readable storage having stored thereon, a computer program having at least one code section for image processing, the at least one code section being executable by a machine for causing the machine to perform steps comprising:

determining temporal positions for output frames based at least in part on a fraction of an interval between a corresponding prior source frame and a successive different source frame in a plurality of source input frames;

determining an image blend mode for each said output frames according to a pulldown phase determined from the plurality of source input frames and the fraction;

determining a rounding range based at least in part on the determined image blend mode for each of said output frames; and generating said output frames based at least in part on said determined temporal positions, said image blend mode, and said rounding range.

18. The non-transitory machine-readable storage according to claim 17, wherein said at least one code section comprises code that enables temporally spacing said generated output frames at evenly spaced positions.

19. The non-transitory machine-readable storage according to claim 18, wherein said at least one code section comprises code that enables modifying said temporal positions of generated output frames based at least in part on a determined offset for the fraction of said interval between said corresponding prior source frame and said successive different source frame for one or more output frames within a sequence.

20. The non-transitory machine-readable storage according to claim 19, wherein said at least one code section comprises code that enables modifying said determined image blend mode for one or more of said output frames comprising said modified temporal spacing.

21. The non-transitory machine-readable storage according to claim 17, wherein said at least one code section comprises code that enables programming said generation of said output frames based at least in part on said determined image blend mode and said determined temporal position for said corresponding output frames.

22. The non-transitory machine-readable storage according to claim 17, wherein said at least one code section comprises code that enables increasing a rate of said source frames and inserting one or more repeated ones of said source frames within a sequence of source frames.

* * * * *